(12) United States Patent
Giesselmann

(10) Patent No.: US 11,187,264 B2
(45) Date of Patent: Nov. 30, 2021

(54) BEARING DEVICE, COMPRESSOR AND METHOD FOR PRODUCING SUCH A BEARING DEVICE

(71) Applicant: Robert Bosch GmbH, Stuttgart (DE)

(72) Inventor: Nils Giesselmann, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 16/326,550

(22) PCT Filed: Jul. 27, 2017

(86) PCT No.: PCT/EP2017/068967
§ 371 (c)(1),
(2) Date: Mar. 28, 2019

(87) PCT Pub. No.: WO2018/033356
PCT Pub. Date: Feb. 22, 2018

(65) Prior Publication Data
US 2020/0386267 A1   Dec. 10, 2020

(30) Foreign Application Priority Data

Aug. 19, 2016   (DE) ..................... 10 2016 215 638.1

(51) Int. Cl.
*F16C 17/10* (2006.01)
*F04D 29/62* (2006.01)
(Continued)

(52) U.S. Cl.
CPC ........ *F16C 17/107* (2013.01); *F04D 29/0513* (2013.01); *F04D 29/622* (2013.01);
(Continued)

(58) Field of Classification Search
CPC ...... F16C 17/10; F16C 17/102; F16C 17/105; F16C 17/107; F16C 23/02; F16C 23/04;
(Continued)

(56) References Cited

U.S. PATENT DOCUMENTS

| 4,884,899 A | * | 12/1989 | Schwartzman | ......... F16C 17/10 |
| | | | | 384/100 |
| 2007/0110348 A1 | * | 5/2007 | Obara | .................... F16C 17/107 |
| | | | | 384/107 |

(Continued)

FOREIGN PATENT DOCUMENTS

| CN | 104295498 A | 1/2015 |
| CN | 105492777 A | 4/2016 |

(Continued)

OTHER PUBLICATIONS

International Search Report dated Dec. 1, 2017 of the corresponding International Application PCT/EP2017/068967 filed Jul. 27, 2017.

*Primary Examiner* — Alan B Waits
(74) *Attorney, Agent, or Firm* — Norton Rose Fulbright US LLP; Gerard Messina

(57) ABSTRACT

A bearing device, a compressor and a method, in which a first radial bearing element is measured in at least the radial direction, an axial distance of the first axial bearing element from the first radial bearing element being measured, the second radial bearing element being measured in at least the radial direction, the first radial bearing element being positioned with respect to the second radial bearing element as a function of the predefined first width of the radial gap, the adjustment arrangement being situated in such a way that the axial gap has the predefined second width.

9 Claims, 4 Drawing Sheets

(51) Int. Cl.
*F16C 23/02* (2006.01)
*F04D 29/051* (2006.01)
*F04D 29/056* (2006.01)

(52) U.S. Cl.
CPC .......... *F04D 29/624* (2013.01); *F16C 17/105* (2013.01); *F16C 23/02* (2013.01); *F04D 29/056* (2013.01); *F16C 2240/30* (2013.01); *F16C 2240/40* (2013.01); *F16C 2360/00* (2013.01); *F16C 2370/12* (2013.01)

(58) Field of Classification Search
CPC .............. F16C 2240/30; F16C 2240/40; F16C 2360/00; F16C 2370/12; F04D 29/0513; F04D 29/056; F04D 29/622; F04D 29/624

See application file for complete search history.

(56) References Cited

U.S. PATENT DOCUMENTS

| | | |
|---|---|---|
| 2011/0223009 A1 | 9/2011 | Grann et al. |
| 2015/0267717 A1 | 9/2015 | Fujii et al. |
| 2017/0097049 A1* | 4/2017 | Bachmaan ............ F16C 17/045 |

FOREIGN PATENT DOCUMENTS

| | | |
|---|---|---|
| CN | 105650117 A | 6/2016 |
| EP | 2921709 | 9/2015 |

* cited by examiner

BEARING DEVICE, COMPRESSOR AND METHOD FOR PRODUCING SUCH A BEARING DEVICE

FIELD OF THE INVENTION

The present invention relates to a bearing device, a related compressor and a related method.

BACKGROUND INFORMATION

A compressor system may include a compressor having a compressor rotor and an electric machine. The electric machine drives the compressor rotor. In order to switch off the compressor system, the electric machine is switched to a currentless state so that the compressor rotor runs down.

SUMMARY OF THE INVENTION

An objective of the present invention is to provide an improved bearing device, an improved compressor and an improved method for producing such a bearing device.

This objective may be achieved by a bearing device according to the description herein, by a compressor according to the description herein and by a method according to the description herein. Advantageous specific embodiments are disclosed in the further descriptions herein.

It was recognized that an improved bearing device may be provided in that the bearing device comprises a fluid-dynamic radial bearing and a fluid-dynamic axial bearing, the radial bearing comprising a first radial bearing element and a second radial bearing element. The axial bearing comprises at least one first axial bearing element and a second axial bearing element, the adjustment arrangement being connected to the second axial bearing element. The first radial bearing element and the first axial bearing element are coupled to each other in a torque-locked manner and are situated rotatably about an axis of rotation. The second radial bearing element and the second axial bearing element are connected to each other in a torque-locked manner and are situated in a rotatably fixed manner. An axial gap extending in the axial direction is provided between the first axial bearing element and the adjustment arrangement, a radial gap having a predefined width in the radial direction being situated between the first radial bearing element and the second radial bearing element, the first radial bearing element and the second radial bearing element being configured in a conically corresponding manner with respect to each other at least in sections, a gap width of the axial gap being adjustable to a predefined value using the adjustment arrangement.

This development has the advantage of making it possible to widen a tolerance window for producing the radial bearing, particularly for producing the first and/or second radial bearing element, and thus making it possible to configure the radial bearing in particularly cost-effective and simple manner. Furthermore, an eccentric position of the first radial bearing element with respect to the axis of rotation is limited.

In another specific embodiment, the second axial bearing element is situated on a side facing the first radial bearing.

In another specific embodiment, the first axial bearing element and/or the second axial bearing element are situated so as to run perpendicularly with respect to the axis of rotation.

In another specific embodiment, the first radial bearing element has a first radial bearing surface and/or the second radial bearing element has a second radial bearing surface, the first radial bearing surface and/or the second radial bearing surface enclosing with respect to the axis of rotation an angle of a value, the value lying in a range from 0.1° to 0.3°, in particular in a range from 0.1° to 0.15°. This ensures by the conical configuration of the radial bearing surface that the generation of an axial force by the radial bearing is essentially avoided. As a result, it is possible to dispense with a stronger construction of the axial bearing.

In another specific embodiment, the axial bearing has a third axial bearing element, the third axial bearing element being situated in a rotatably fixed manner, the third axial bearing element may be situated on a side of the first axial bearing element facing away from the radial bearing, another adjustment arrangement being situated between the third axial bearing element and the first axial bearing element, a second axial gap being situated between the adjustment arrangement and the first axial bearing element, the additional adjustment arrangement being developed to adjust a further gap width of the additional axial gap to a predefined further value.

It is of particular advantage if the bearing device is developed as described above and the value of the gap width is essentially identical to the value of the further gap width or if the value of the gap width is greater than the value of the further gap width or if the value of the gap width is smaller than the value of the further gap width.

In another specific embodiment, the compressor system for a heat pump circuit has a shaft and a bearing device, the bearing device being configured as described above, the bearing device supporting the shaft so that it is rotatable about the axis of rotation.

For producing the bearing device described above, it is particularly advantageous if the first radial bearing element is measured at least in the radial direction, an axial distance of the first axial bearing element from the first radial bearing element being measured in the process, the second radial bearing element being measured at least in the radial direction, the first radial bearing element being position with respect to the second radial bearing element as a function of a predefined value of the width of the radial gap, the adjustment arrangement being set in such a way that the gap width of the axial gap has the predefined value.

The present invention is explained in more detail below with reference to figures.

DETAILED DESCRIPTION

Figure 1:
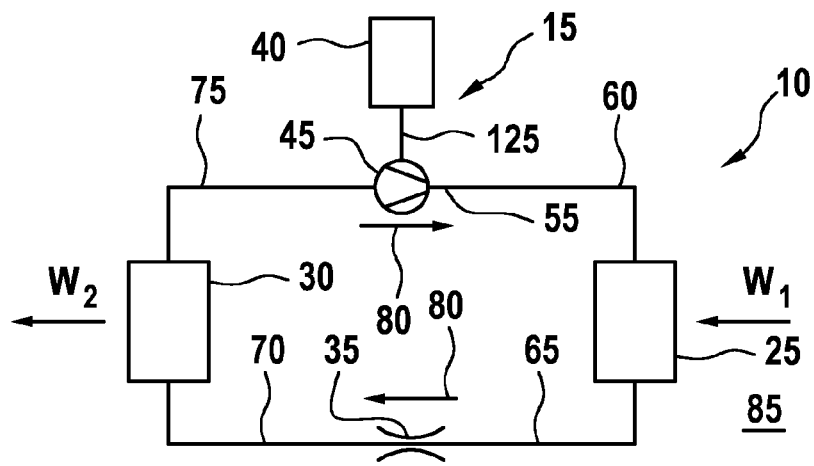
FIG. 1 shows a schematic representation of a heat pump circuit.

The heat pump circuit 10 includes a compressor system 15, a first heat exchanger 25, a second heat exchanger 30 and a throttle 35.

Compressor system 15 has an electric machine 40 and a compressor 45. Electric machine 40 is used to drive compressor 45. Compressor 45 is configured as a turbo machine.

Compressor 45 has an input side 50 and an output side 55. The output side 55 of compressor 45 is connected to an input side of first heat exchanger 25 by a first fluidic connection 60. On the output side, first heat exchanger 25 is connected to throttle 35 via a second fluidic connection 65. Throttle 35 is connected to an input side of second heat exchanger 30 via a third fluidic connection 70. An output side of the second heat exchanger 30 is connected to input side 50 of compressor 45 by a fourth fluidic connection 75. The heat pump circuit 10 furthermore comprises a heat-transfer medium 80. Heat-transfer medium 80 may include for example propane, butane and/or $CO_2$.

Compressor 45 conveys heat-transfer medium 80 from input side 50 to output side 55 and in the process compresses heat-transfer medium 80. Heat-transfer medium 80 is conveyed to first heat exchanger 25 via first fluidic connection 60. First heat exchanger 25 acts as an evaporator and in the process takes up heat $W_1$ from a surroundings 85 for example. The heat-transfer medium 80 is conveyed to throttle 35 via second fluidic connection 65. A pressure of heat-transfer medium 80 is reduced at throttle 35. Heat-transfer medium 80 flows at reduced pressure to the second heat exchanger 30 via third fluidic connection 70. Second heat exchanger 30 acts as a condenser. In the process, heat-transfer medium 80 gives off heat $W_2$. The heat $W_2$ output may be used to heat a building for example. It is also possible, for example, to use it to heat another heat-transfer medium, for example in a buffer store of a heating system, via second heat exchanger 30. Heat-transfer medium 80 is returned to input side 50 of compressor 45 via fourth fluidic connection 75.

Figure 2:
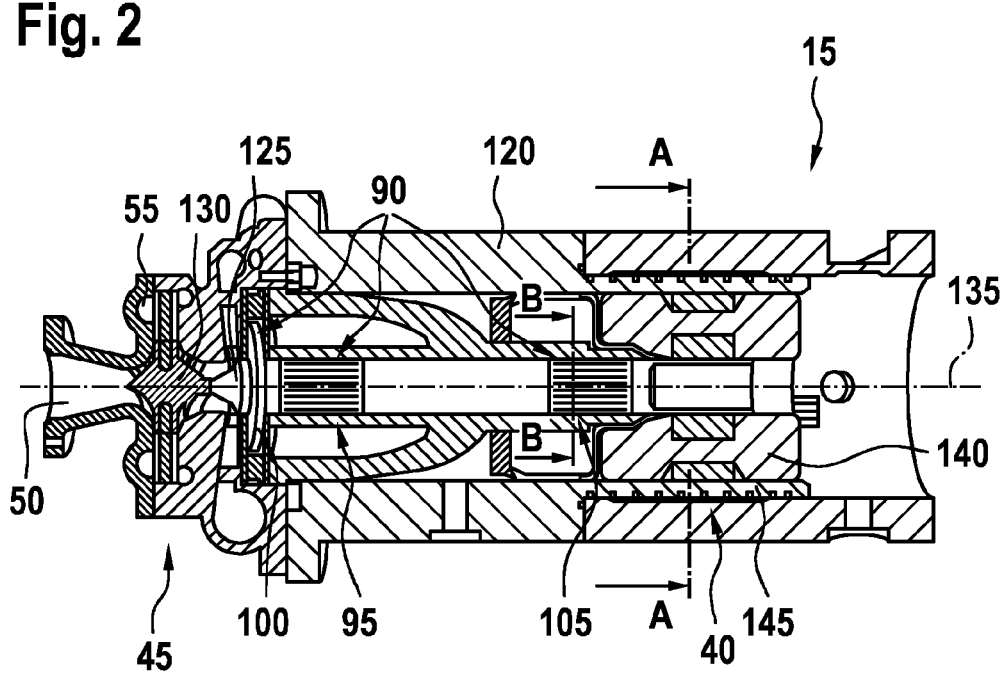
FIG. 2 shows a longitudinal section through an exemplary constructive development of a compressor system of the heat pump circuit.

FIG. 2 shows a longitudinal section through an exemplary constructive development of the compressor system 15 shown in FIG. 1.

In the specific embodiment, compressor 45 is developed as a radial compressor by way of example. Another constructive development of compressor 45 is of course also conceivable. Thus it is also conceivable, for example, that compressor 45 is developed as an axial compressor.

Compressor system 15 has a bearing device 90. Bearing device 90 comprises for example a fluid-dynamic first radial bearing 95, a fluid-dynamic axial bearing 100 and, by way of example, a second fluid-dynamic radial bearing 105.

Compressor system 15 furthermore has a housing 120 and a shaft 125. Compressor 45 has a compressor rotor 130. Bearing device 90 supports shaft 125 so that it is rotatable about an axis of rotation 135. The input side 50 of compressor 45 is situated radially on the inner side relative to axis of rotation 135, while output side 55 of compressor 45 is situated radially on the outer side relative to axis of rotation 135.

Electric machine 40 has a machine rotor 140 and a machine stator 145. Machine stator 145 is rotatably fixed and is connected to housing 120. Machine rotor 140 is coupled in a torque-locked manner to compressor rotor 130 by way of shaft 125. It is also conceivable, of course, that for example a clutch and/or a transmission device or other devices are provided between machine rotor 140 and compressor rotor 130 in order to couple compressor rotor 130 to machine rotor 140.

In the specific embodiment, by way of example, first radial bearing 95 and second radial bearing 105 support shaft 125 so that it is rotatable about axis of rotation 135. Axial bearing 100 defines an axial position of shaft 125. By coupling compressor rotor 130 and machine rotor 140 with shaft 125, machine rotor 140 and compressor rotor 130 are in this manner also supported so as to be rotatable about axis of rotation 135, and the axial position of both compressor rotor 130 as well as of machine rotor 140 is defined by axial bearing 100. The bearing device 90 may also be situated at another position, for example on compressor rotor 130 and/or on machine rotor 140.

Developing first radial bearing 95, axial bearing 100 and second radial bearing 105 respectively as fluid-dynamic bearings ensures that shaft 125 is supported in a manner that is particularly low in friction, particularly at high rotational speeds.

Figure 3:
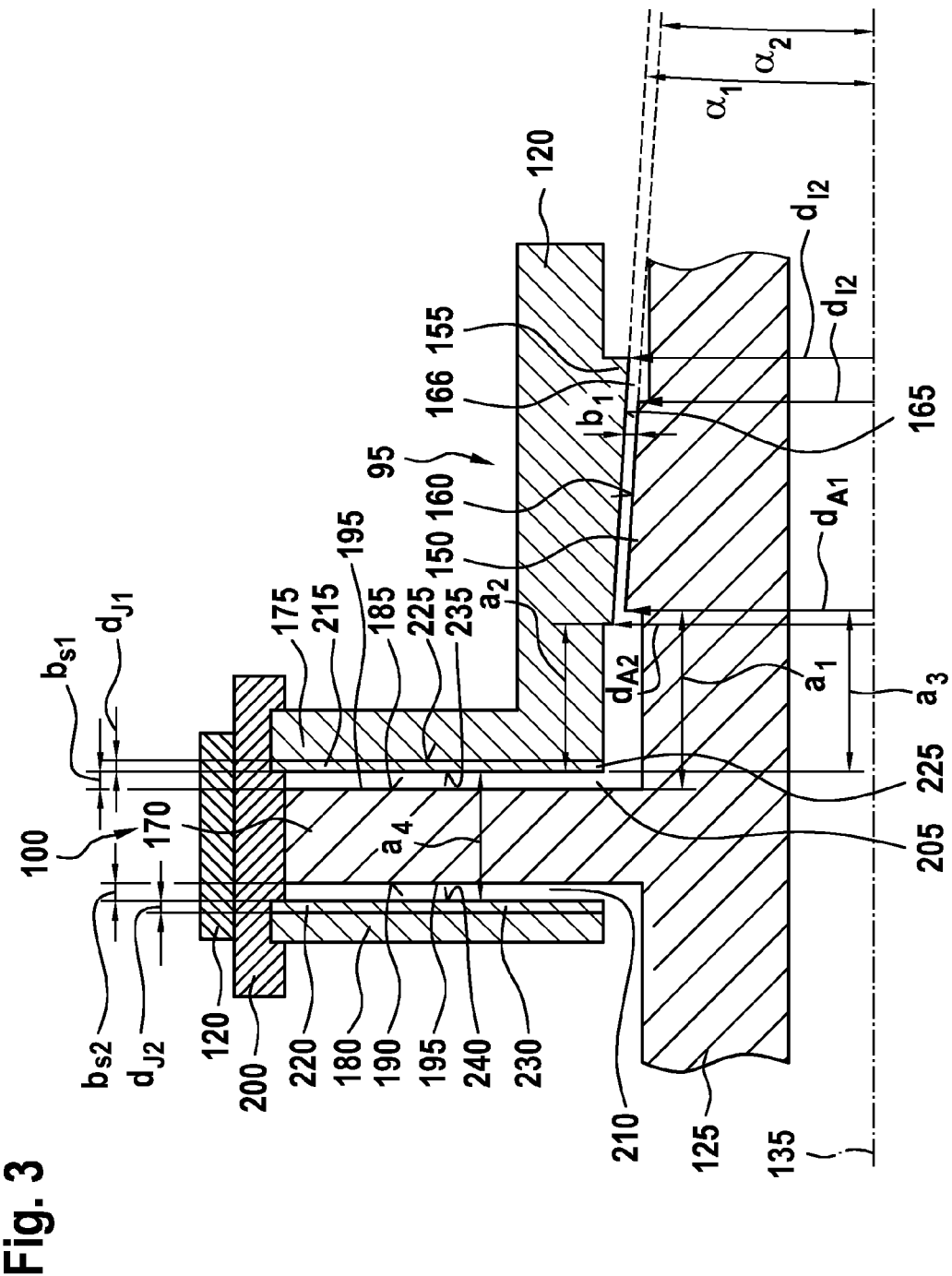
FIG. 3 shows a section of the longitudinal section shown in FIG. 2.

FIG. 3 shows a section of the longitudinal half-section through compressor system 15 shown in FIG. 2.

First radial bearing 95 has a first radial bearing element 150 and a second radial bearing element 155. First radial bearing element 150 is situated radially on the outer side on shaft 125. Second radial bearing element 155 is connected to housing 120 in a torque-locked manner so that second radial bearing element 155 is rotatably fixed. Radially on the outer side, first radial bearing element 150 has a first radial bearing surface 160 on an outer circumferential surface, and second radial bearing element 155 has a second radial bearing surface 165 on an inner circumferential surface. First radial bearing surface 160 may be situated parallel to second radial bearing surface 165. In the operation of compressor system 15, when shaft 125 rotates above a limit speed, first radial bearing surface 160 is situated at a distance from second radial bearing surface 165 so that a radial gap 166 is provided between first radial bearing surface 160 and second radial bearing surface 165.

Radial gap 166 has a width $b_1$ in the radial direction. First radial bearing surface 160 and second radial bearing surface 165 are developed in a conical manner, by way of example. First radial bearing surface 160 in this instance encloses a first angle $\alpha_1$ with respect to axis of rotation 135. Second radial bearing surface 165 in this instance encloses a second angle $\alpha_2$ with respect to axis of rotation 135. First angle $\alpha_1$ and/or second angle $\alpha_2$ has a value, the value being in a range from 0.1° to 0.3°, in particular in a range from 0.1° to 0.15°. First radial bearing surface 160 and second radial bearing surface 165 may be situated in parallel to each other.

Second radial bearing 105 may be developed identically with respect to first radial bearing 95. Second radial bearing 105 may also be developed differently than first radial bearing 95.

Axial bearing 100 has a first axial bearing element 170, a second axial bearing element 175 and a third axial bearing element 180. First axial bearing element 170 is connected to shaft 125 in a torque-locked manner. In the specific embodiment, first axial bearing element 170 is situated in a rotational plane perpendicularly with respect to axis of rotation 135. First axial bearing element 170 has a first axial bearing surface 185 on a front side facing second axial bearing element 175 and first radial bearing 95 and has a second axial bearing surface 190 on another front side facing away from first radial bearing 95. A support structure 195 may be provided on first axial bearing surface 185 and/or on second axial bearing surface 190. Support structure 195 may have a herringbone-type pattern for example.

Second axial bearing element 175 and third axial bearing element 180 are connected to housing 120 in a torque-locked manner. It is in particular conceivable in this regard, that radially on the outside a coupling element 200 connects second axial bearing element 175 and third axial bearing element 180 to each other. Coupling element 200 is situated radially on the outside of a radially outer end of first axial bearing element 170. Coupling element 200 is connected radially on the outside to housing 120.

Bearing device 90 furthermore comprises a first adjustment arrangement 215 and by way of example a second adjustment arrangement 220. Second adjustment arrangement 220 may also be omitted. First adjustment arrangement 215 and second adjustment arrangement 220 is configured in a disk-shaped manner by way of example. First adjustment arrangement 215, for example, has at least one first spacer 225, these being arranged in a first stack in the event that there are multiple first spacers 225. The first spacers 225 arranged in the first stack may respectively have an identical or a different axial thickness. First adjustment arrangement 215 has a first thickness $d_{J1}$ in the axial direction and is connected to second axial bearing element 175. On a front side facing second axial bearing element 175, first adjustment arrangement 215 has a third axial bearing surface 235. In the axial direction, a first axial gap 205 is situated between first axial bearing surface 185 and third axial bearing surface 235. First axial gap 205 has a first axial gap width $b_{S1}$ having a predefined first value.

Second adjustment arrangement 220 is situated axially between third axial bearing element 180 and first axial bearing element 170 and is connected to third axial bearing element 180. Second adjustment arrangement 220 has a second thickness $d_{J2}$ in the axial direction. By way of example, second adjustment arrangement 220 has at least one second spacer 230, in the event that there are multiple second spacers 230 these being arranged in a second stack. Spacers 230 arranged in the second stack may respectively have an identical or a different axial thickness. First and second adjustment arrangement 215, 220 are connected to third axial bearing element 180 in a torque-locked manner by coupling element 200 and are thus rotatably fixed.

Second adjustment arrangement 220 has a fourth axial bearing surface 240 on a front side facing second axial bearing surface 190. Together with second axial bearing surface 190, fourth axial bearing surface 240 bounds a second axial gap 210. Second axial gap 210 has a second axial gap width $b_{S2}$ having a predefined second value. The first value of the first gap width $b_{S1}$ may be identical to the second value of second gap width $b_{S2}$.

When compressor system 15 is in operation, shaft 125 rotates at a high rotational speed, which may be at a rotational speed greater than 60,000 revolutions per minute. In the process, a pressure cushion is formed in radial gab 166, which bears first radial bearing element 150. Furthermore, another pressure cushion is formed respectively in first and second axial gap 205, 210, which prevents first axial bearing element 170 from striking against third and/or fourth axial bearing surface 235, 240.

Furthermore, the predefined width $b_1$ of radial gap 166 ensures that axis of rotation 135 is not situated too far eccentrically with respect to a bearing axis of second radial bearing element 155. Predefined width $b_1$ furthermore ensures a high load-bearing capacity of radial bearing 95, 105. The slight conical configuration and the low value of angle α furthermore ensure that radial bearing 95, 105 essentially produces no axial force that needs to be supported by axial bearing 100.

Figure 4:
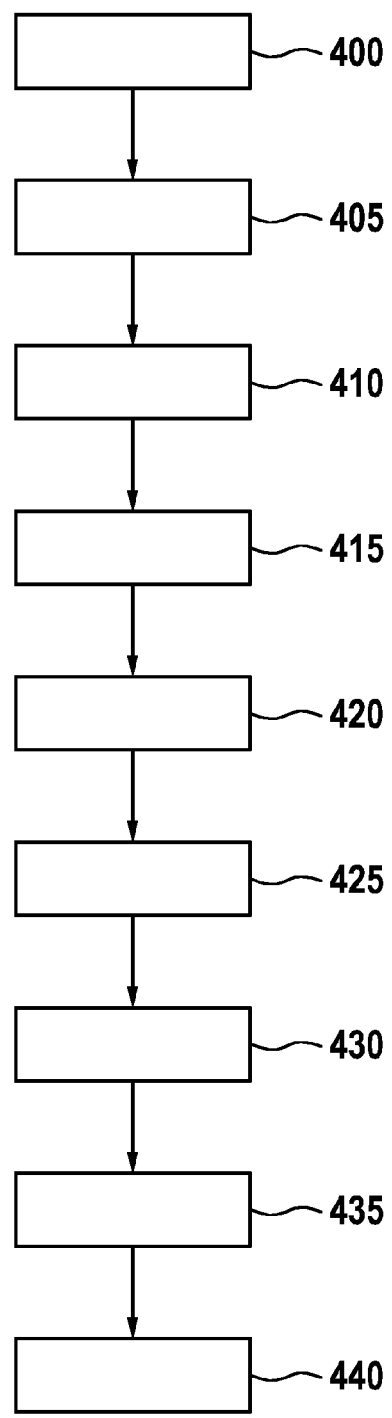
FIG. 4 shows a flow chart of a method for producing the bearing device shown in FIG. 4.
Figure 5:
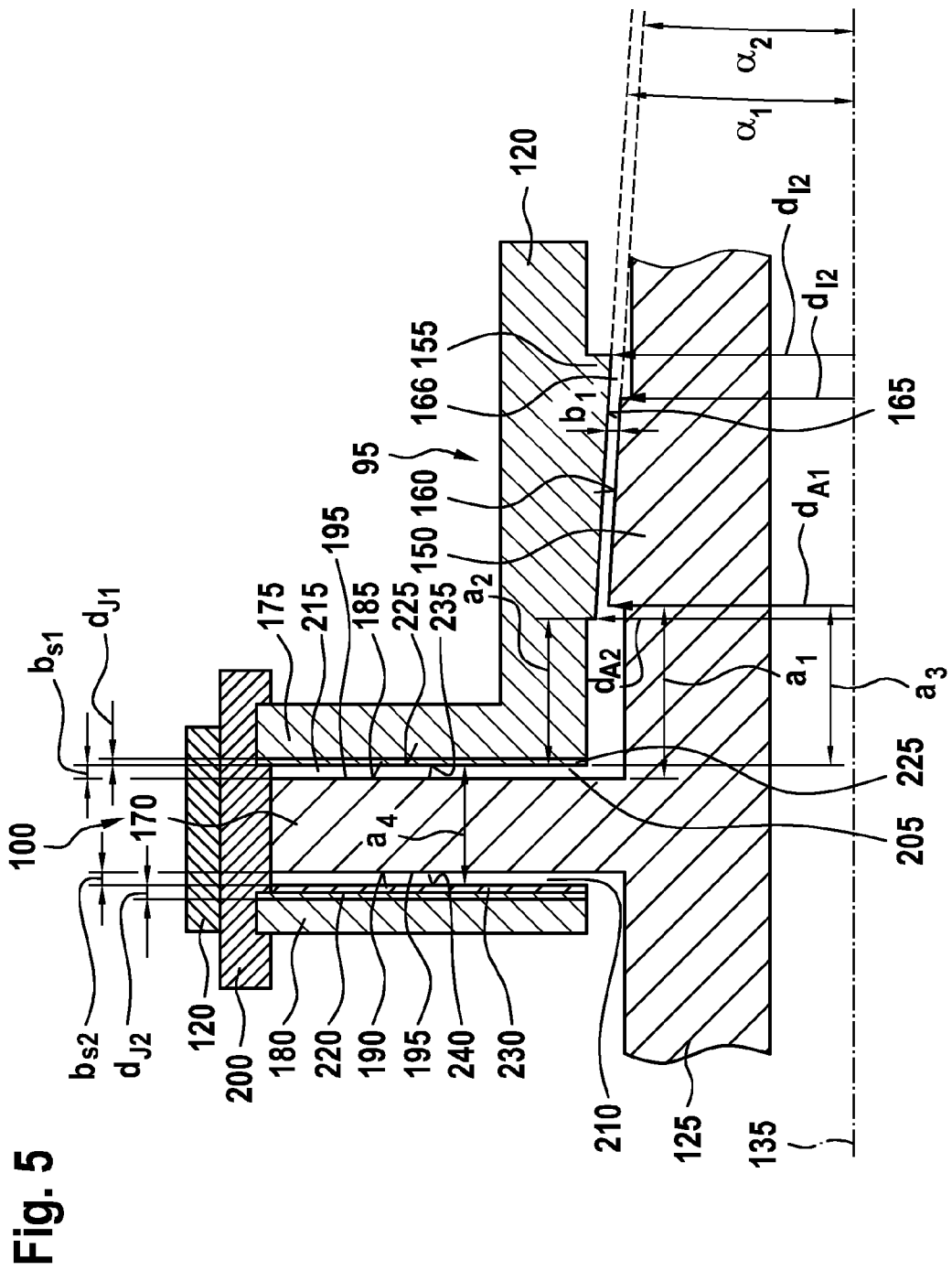
FIG. 5 shows a section of the bearing device shown in FIG. 3 following a sixth method step.

FIG. 4 shows a flow chart of a method of a method for producing the bearing device 90 shown in FIGS. 2 and 3. FIG. 5 shows a section of bearing device 90 shown in FIG. 3 after a sixth method step 425.

In a first method step 400, first radial bearing surface 160 is ground. First radial bearing element 150 may be developed in one piece and in uniform material with shaft 125. It is also possible for first radial bearing element 150 to be configured in an annular manner and to be mounted on shaft 125 radially on the outside.

In a second method step 405, second radial bearing surface 165 of second radial bearing element 155 is ground.

In a third method step 410, the radial development of first radial bearing surface 160 is measured. For this purpose, both the first angle $α_1$ of first radial bearing surface 160 is measured with respect to axis of rotation 135 and a first (minimum) outer diameter $d_{A1}$ and a second (maximum) outer diameter $d_{A2}$ are measured on the respective axial ends of first radial bearing surface 160.

Furthermore, a first (minimum) distance $a_1$ of first radial bearing surface 160 is measured with respect to first axial bearing surface 185.

In a fourth method step 415, the geometrical development of second radial bearing surface 165 is measured. For this purpose, both the second angle $α_2$ of second radial bearing surface 165 with respect to axis of rotation 135 is measured and a first (minimum) inner diameter $d_{I1}$ as well as a second (maximum) inner diameter $(d_{I2})$ of second radial bearing surface 165 are measured on the respective axial ends of second radial bearing surface 165. Furthermore, a second (minimum) distance $a_2$ of third axial bearing surface 235 with respect to second radial bearing surface 165 is measured.

In a fifth method step 420, an axial position of first radial bearing element 150 relative to second radial bearing element 155 is calculated on the basis of the measured geometric development of first radial bearing surface 160, in particular of first angle $α_1$ and of first and second outer diameter $d_{A1}$, $d_{A2}$ and of the geometric development of second radial bearing surface 165, in particular of second angle $α_2$ of second radial bearing surface 165 with respect to axis of rotation 135 and of first and second inner diameters $d_{I1}$, $d_{I2}$, as well as of first distance $a_1$ and of second distance $a_2$ in combination with a predefined value for the width. The axial position may be for example a relative position of a third minimum distance $a_3$ of first radial bearing surface 160 with respect to third axial bearing surface 235.

In a sixth method step 425, first radial bearing element 150 is situated in the position described in fifth method step 420 and is fixed in this position.

In a seventh method step 430, first gap width $b_{S1}$ and second gap width $b_{S2}$ are measured.

In an eighth method step 435, first gap width $b_{S1}$ is set to the predefined first value by changing the first thickness $d_{J1}$ of first adjustment arrangement 215. It is possible to change a number of first spacers 225 in the first stack in order to adapt the first thickness $d_{J1}$. For example, a number of first spacers 225 in the first stack is reduced.

In a ninth method step 440, second gap width $b_{S2}$ is set to the predefined second value by changing the second thickness $d_{J2}$ of second adjustment arrangement 220. It is possible to change a number of second spacers 230 in the second stack in order to adapt the second thickness $d_{J2}$. For example, in an identical axial development of first spacer 225 and second spacer 230, a number of second spacers 230 in the second stack is increased by an identical number.

This ensures that furthermore a fourth distance $a_4$ between third axial bearing surface 235 and fourth axial bearing surface 240 is constant during assembly and that on the other hand first axial gap 205 and second axial gap 210 ideally have identical values for the gap width $b_{S1}$, $b_{S2}$.

The compressor system 15 described in FIGS. 1 through 5 has the advantage that it is possible to widen a tolerance window of radial bearing 95, 105 in the radial direction, and that it is thus particularly cost-effective and simple to produce radial bearing 95, 105. It is in particular conceivable, for example, that the manufacturing tolerance for producing the radial bearing surfaces 160, 165 and/or the first and/or second axial bearing surface 185, 190 may be raised by up to 300%, for example from 1 μm to 4 μm.

This furthermore prevents the first radial bearing element 150 from striking against the second radial bearing element 155 when positioning first radial bearing element 150 relative to second radial bearing element 155. This ensures that the radial gap 166 has the predefined width $b_1$.

It should be noted that, particularly at the end of the tolerance window, the first axial bearing section 170 may be shifted so far in the axial direction that the first adjustment arrangement 215 must be omitted between first axial bearing surface 185 and second axial bearing element 175, or that the second adjustment arrangement 220 must be omitted between the second axial bearing surface 190 and the third axial bearing element 180. In this case, the respectively other adjustment arrangement 215, 220 then respectively has its maximum thickness $d_{J1}$, $d_{J2}$.

What is claimed is:

1. A bearing device for a compressor system having a compressor, comprising:
   a fluid-dynamic radial bearing;
   a fluid-dynamic axial bearing; and
   an adjustment arrangement;
   wherein the radial bearing includes a first radial bearing element and a second radial bearing element,
   wherein the axial bearing includes at least a first axial bearing element and a second axial bearing element,
   wherein the adjustment arrangement is connected to the second axial bearing element,
   wherein the first radial bearing element and the first axial bearing element are coupled to each other in a torque-locked manner and are rotatable about an axis of rotation,
   wherein the second radial bearing element and the second axial bearing element are connected to each other in a torque-locked manner and are rotatably fixed,
   wherein an axial gap extends in the axial direction between the first axial bearing element and the adjustment arrangement,
   wherein a radial gap has a predefined width in the radial direction being situated between the first radial bearing element and the second radial bearing element,
   wherein the first radial bearing element and the second radial bearing element are configured at least in sections in a conically corresponding manner with respect to each other,
   wherein a gap width of the axial gap is adjustable to a predefined value using the adjustment arrangement,
   wherein the bearing device is configured to support a shaft of the compressor,
   wherein the adjustment arrangement is configured in a disk-shaped manner, and has a stack of spacers, wherein the adjustment arrangement has a thickness in an axial direction and is connected to the second axial bearing element, and
   wherein an eccentric position, with respect to a bearing axis of second radial bearing element, of the first radial bearing element with respect to the axis of rotation is limited by the predefined width of the radial gap.

2. The bearing device of claim 1, wherein the second axial bearing element is situated on a side facing the radial bearing.

3. The bearing device of claim 1, wherein the first axial bearing element and/or the second axial bearing element is situated to run perpendicularly to the axis of rotation.

4. The bearing device of claim 1, wherein the first radial bearing element has a first radial bearing surface and/or the second radial bearing element has a second radial bearing surface, wherein the first and/or the second radial bearing surface encloses an angle having a value with respect to the axis of rotation, and wherein the value lies in a range from 0.1° to 0.3°.

5. The bearing device of claim 1, wherein the axial bearing includes a third axial bearing element, wherein:
   the third axial bearing element is rotatably fixed,
   the third axial bearing element is situated on a side of the first axial bearing element facing away from the radial bearing,
   another adjustment arrangement is situated between the third axial bearing element and the first axial bearing element,
   a second axial gap is between the additional adjustment arrangement and the first axial bearing element, and
   the additional adjustment arrangement is configured so that a further gap width of the additional axial gap is adjustable to a predefined further value.

6. The bearing device of claim 5, wherein the value of the gap width and the value of the additional gap width are the same.

7. The bearing device of claim 5, wherein the value of the gap width is greater than the value of the additional gap width.

8. The bearing device of claim 5, wherein the value of the gap width is smaller than the value of the additional gap width.

9. The bearing device of claim 1, wherein the first radial bearing element has a first radial bearing surface and/or the second radial bearing element has a second radial bearing surface, wherein the first and/or the second radial bearing surface encloses an angle having a value with respect to the axis of rotation, and wherein the value lies in a range from 0.1° to 0.15°.

* * * * *